United States Patent
Li et al.

(10) Patent No.: US 9,594,297 B2
(45) Date of Patent: Mar. 14, 2017

(54) LIGHTING DISPLAY DEVICE HAVING SURFACE LIGHT SOURCE AND DISPLAY UNIT

(71) Applicant: BOE Technology Group Co., Ltd., Beijing (CN)

(72) Inventors: Wenbo Li, Beijing (CN); Yanbing Wu, Beijing (CN); Yefei Dong, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 198 days.

(21) Appl. No.: 14/573,203

(22) Filed: Dec. 17, 2014

(65) Prior Publication Data

US 2016/0011496 A1   Jan. 14, 2016

(30) Foreign Application Priority Data

Jul. 9, 2014  (CN) .......................... 2014 1 0325991

(51) Int. Cl.
  *G03B 21/20* (2006.01)
  *G03B 21/604* (2014.01)
  *G03B 21/00* (2006.01)

(52) U.S. Cl.
  CPC ....... *G03B 21/2073* (2013.01); *G03B 21/006* (2013.01); *G03B 21/604* (2013.01)

(58) Field of Classification Search
  CPC . G03B 21/2073; G03B 21/006; G03B 21/604
  See application file for complete search history.

(56) References Cited

U.S. PATENT DOCUMENTS

| 5,815,221 A | 9/1998 | Kojima et al. |
| 2002/0180933 A1 | 12/2002 | Ito |
| 2004/0100598 A1 | 5/2004 | Adachi et al. |

FOREIGN PATENT DOCUMENTS

| CN | 1493016 | 4/2004 |
| CN | 103064211 | 4/2013 |

OTHER PUBLICATIONS

Office Action from Chinese Patent Application No. 201410325991. 0, dated May 3, 2016.
(Continued)

*Primary Examiner* — Joseph L Williams
(74) *Attorney, Agent, or Firm* — Westman, Champlin & Koehler, P.A.

(57) ABSTRACT

A lighting display device is disclosed in embodiments of the present invention. The lighting display device includes a surface light source type display lamp having a backlight source, a first transparent substrate and a second transparent substrate laminated in sequence in a direction away from the backlight source, a liquid crystal layer disposed between the first transparent substrate and the second transparent substrate, a polarizer disposed on a side of the first transparent substrate facing the backlight source, and pixel units disposed on one of the first transparent substrate and the second transparent substrate, the pixel units being arranged in a matrix and being configured to control rotation of liquid crystal molecules in the liquid crystal layer, and a display unit spaced from the surface light source type display lamp by a set distance, wherein the display unit has a polarization and reflection structure which is configured to cooperate with the polarizer, and is configured to reflect light emitted by the surface light source type display lamp to display.

20 Claims, 2 Drawing Sheets

(56) References Cited

OTHER PUBLICATIONS

Second Office Action for Chinese Patent Application No. 201410325991.0, dated Dec. 30, 2016, 10 pages.

LIGHTING DISPLAY DEVICE HAVING SURFACE LIGHT SOURCE AND DISPLAY UNIT

CROSS-REFERENCE TO RELATED APPLICATION

This application claims the benefit of Chinese Patent Application No. 201410325991.0 filed on Jul. 9, 2014 in the State Intellectual Property Office of China, the whole disclosure of which is incorporated herein by reference.

BACKGROUND OF THE INVENTION

1. Field of the Invention

Embodiments of the present invention relate to the field of lighting, and particularly to a lighting display device.

2. Description of the Related Art

Conventional luminaire changeable only in color of light and is poor in applicability.

SUMMARY OF THE INVENTION

An object of embodiments of the present invention is to provide a lighting display device, thereby improving applicability of the lighting display device.

According to embodiments of the present invention, there is provided a lighting display device, comprising:

a surface light source type display lamp comprising a backlight source, a first transparent substrate and a second transparent substrate laminated in sequence in a direction away from the backlight source, a liquid crystal layer disposed between the first transparent substrate and the second transparent substrate, a polarizer disposed on a side of the first transparent substrate facing the backlight source, and pixel units disposed on one of the first transparent substrate and the second transparent substrate, the pixel units being arranged in a matrix and being configured to control rotation of liquid crystal molecules in the liquid crystal layer, and a display unit spaced from the surface light source type display lamp by a set distance, wherein the display unit has a polarization and reflection structure which is configured to cooperate with the polarizer, and is configured to reflect light emitted by the surface light source type display lamp to display.

Figure 1:
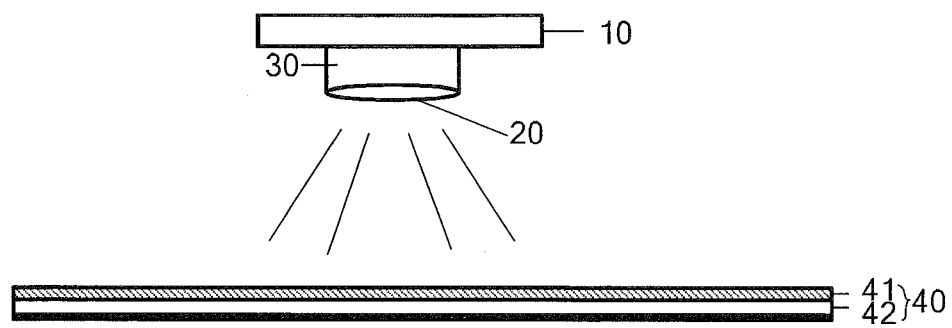
FIG. 1 is a schematic structural diagram of a lighting display device according to an embodiment of the present invention.

The reference numerals in the drawings are listed as follows:

10 base, 20 surface light source type display lamp, 21 backlight source, 22 polarizer, 23 first transparent substrate, 24 liquid crystal layer, 25 second transparent substrate, 30 lamp, 40 display unit, 41 analyzer, and, 42 reflector layer or reflector surface.

DETAILED DESCRIPTION OF THE EMBODIMENTS

A further description of the invention will be made in detail as below with reference to embodiments of the present invention taken in conjunction with the accompanying drawings. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

According to an general concept of the present invention, there is provided a lighting display device, comprising: a surface light source type display lamp comprising a backlight source, a first transparent substrate and a second transparent substrate laminated in sequence in a direction away from the backlight source, a liquid crystal layer disposed between the first transparent substrate and the second transparent substrate, a polarizer disposed on a side of the first transparent substrate facing the backlight source, and pixel units disposed on one of the first transparent substrate and the second transparent substrate, the pixel units being arranged in a matrix and being configured to control rotation of liquid crystal molecules in the liquid crystal layer, and a display unit spaced from the surface light source type display lamp by a set distance, wherein the display unit has a polarization and reflection structure which is configured to cooperate with the polarizer, and is configured to reflect light emitted by the surface light source type display lamp to display.

With the above lighting display device, the surface light source type display lamp performs lighting, and the display unit displays by reflecting light from the surface light source type display lamp, so that a lighting lamp can display richer contents. After voltage is applied to the liquid crystal layer, light which has passed through the polarizer is deflected after passing through the liquid crystal molecules. The deflected light is irradiated into the display unit and then is reflected by the display unit, so that the contents to be displayed are displayed. As a result, the lighting display device is capable of being used for displaying. When no voltage is applied to the liquid crystal layer, by passing through the polarizer, light emitted by the backlight source is not deflected when passing through the liquid crystal layer. Therefore, when the light is irradiated onto the display unit, it cannot be irradiated into the display unit, so that the display unit is in a dark state. It can be seen from the above description that the lighting display device is capable of achieving both top lighting and bottom displaying, and can be applied in many fields such as information prompting, teaching and training, and entertainment, etc. The lighting display device is multipurpose and highly practical. Therefore, applicability of the luminaire is improved.

In order to improve the applicability of the luminaire, a lighting display device is provided in the embodiments of the present invention. With the above lighting display device, the surface light source type display lamp provides lighting, and the display unit displays contents, such as characters, pictures and movies, by reflecting light from the surface light source type display lamp, so that the applicability of the luminaire is improved.

A further description of the invention will be made in detail as below with reference to embodiments of the present invention taken in conjunction with the accompanying drawings. In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
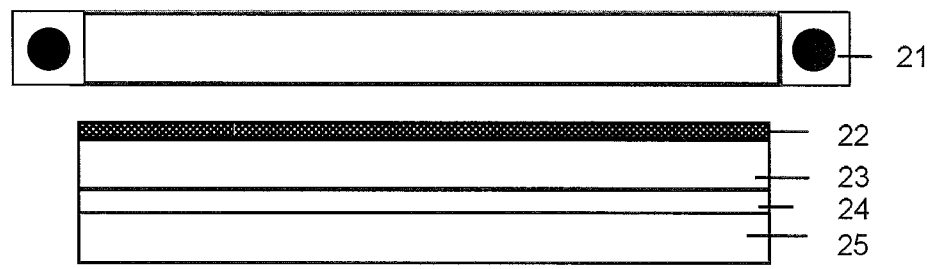
FIG. 2 is a schematic exploded diagram of a surface light source type display lamp according to an embodiment of the present invention.

FIG. 1 is a schematic structural diagram of a lighting display device according to an embodiment of the present invention, and FIG. 2 is a schematic exploded diagram of a surface light source type display lamp according to an embodiment of the present invention.

As shown in FIGS. 1-2, the lighting display device according to the embodiments of the present invention comprises:

a surface light source type display lamp 20 comprising a backlight source 21, a first transparent substrate 23 and a second transparent substrate 25 laminated in sequence in a direction away from the backlight source 21, a liquid crystal layer 24 disposed between the first transparent substrate 23 and the second transparent substrate 25, a polarizer 22 disposed on a side of the first transparent substrate 23 facing the backlight source 21, and pixel units (not shown) disposed on one of the first transparent substrate 23 and the second transparent substrate 25, the pixel units being arranged in a matrix and being configured to control rotation of liquid crystal molecules in the liquid crystal layer 24; and a display unit 40 spaced from the surface light source type display lamp 20 by a set distance, wherein the display unit 40 has a polarization and reflection structure which is configured to cooperate with the polarizer 22 and is configured to reflect light emitted by the surface light source type display lamp 20 to display.

In the surface light source type display lamp 20, the backlight source 21, the first transparent substrate 23, the second transparent substrate 25, the liquid crystal layer 24, the polarizer 22, and pixel units may have the same configurations as those corresponding components of the conventional liquid crystal display.

Figure 3:
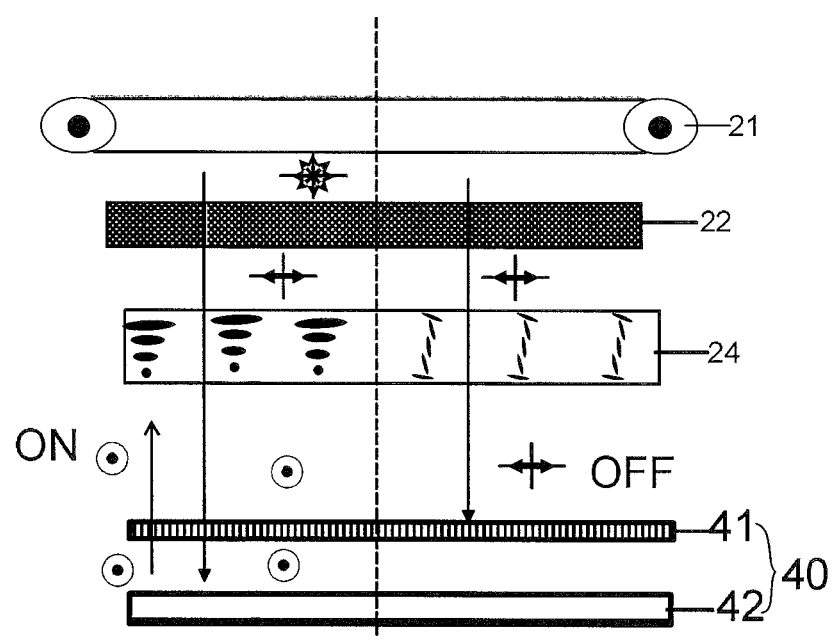
FIG. 3 is a diagram showing an operational principle of a lighting display device according to an embodiment of the present invention.

In the above embodiment, the surface light source type display lamp 20 performs lighting, and the display unit 40 displays by reflecting light from the surface light source type display lamp 20, so that a lighting lamp can display richer contents. Specifically, the surface light source type display lamp 20 is disposed separately from the display unit 40. The display unit 40 is disposed opposite to the surface light source type display lamp 20. For example, the surface light source type display lamp 20 is hung to a ceiling, while the display unit 40 is disposed at a position such as a floor and a desktop. The operational principle of the lighting display device is as shown in FIG. 3. When the surface light source type display lamp 20 performs lighting, the backlight source 21 in the surface light source type display lamp 20 is powered on. Light is emitted from the backlight source 21 and then passes through the first transparent substrate 23, the liquid crystal layer 24 and the second transparent substrate 25. After that, the light is radiated from the surface light source type display lamp 20 for lighting. When displaying is needed to be performed by irradiating the light from the surface light source type display lamp 20 onto the display unit 40, a display signal is inputted into the pixel units so that voltage is applied to the liquid crystal layer 24. One of the first transparent substrate 23 and the second transparent substrate 25 may be an array substrate into which the display signals are inputted, while the other one may be a color filter substrate. After voltage is applied to the liquid crystal layer 24, the liquid crystal molecules are rotated. Here, the light which has passed through the polarizer 22 is deflected after passing through the liquid crystal molecules. The deflected light is capable of being irradiated into the display unit 40 and then being reflected by the display unit 40, so that the contents to be displayed are displayed. As a result, the lighting display device is able to be used for displaying. Once no voltage is applied to the liquid crystal layer 24, the light would not be deflected when passing through the liquid crystal layer 24. Therefore, the light cannot be emitted into the display unit 40 when being irradiated onto the display unit 40, so that the display unit 40 is in a dark state.

It can be seen from the above description that the lighting display device is capable of achieving both top lighting and bottom displaying, and can be applied in many fields such as information prompting, teaching and training, and entertainment, etc. The lighting display device is multipurpose and highly practical. Therefore, applicability of the lighting display device is improved.

Specifically, the display unit 40 is used for displaying, and has a structure which is configured to cooperate with the polarizer 22 of the surface light source type display lamp 20. The display unit 40 will be described in detail as below with reference to embodiments.

The following construction may be adopted for the display unit 40. The display unit 40 comprises a reflective display part, and an analyzer 41 disposed on a side of the reflective display part facing the surface light source type display lamp 20.

Specifically, the analyzer 41 is configured to cooperate with the polarizer 22 of the surface light source type display lamp 20. If the polarizer 22 is embodied as a polarizing sheet possessing a good light filtering effect, the analyzer 41 also is such a polarizing sheet. Polarization direction of the polarizer 22 and that of the analyzer 41 are substantially perpendicular to each other.

An example of the lighting display device will be described as below by referring to FIG. 3 again. In FIG. 3, the polarization direction of the polarizer 22 is parallel to a plane of the paper and the polarization direction of the analyzer 41 is perpendicular to the plane of the paper. As shown in the left portion of FIG. 3, when voltage is applied to the liquid crystal layer 24, light emitted from the backlight source 21 passes through the polarizer 22 and is deflected by the liquid crystal layer 24, and then is irradiated onto the display unit 40. Here, the light is irradiated onto the reflective display part through the analyzer 41. After being reflected by the reflective display part, the light is irradiated into eyes of a viewer. At this moment, a displayed picture can be viewed by the viewer. As shown in the right portion of FIG. 3, when no voltage is applied to the liquid crystal layer 24, after being emitted from the backlight source 21, the light passes through the polarizer 22 and goes to be parallel to a plane of the paper. Since the light is not deflected by the liquid crystal layer 24, it cannot be irradiated onto the reflective display part through the analyzer 41. At this moment, the display unit 40 is in a dark state.

The reflective display part is varied in construction. Specifically, the reflective display part is embodied as a reflector layer or reflector surface 42. The reflector layer or reflector surface 42 is able to perform good reflection of light irradiated thereon. In some embodiments, the reflector layer or reflector surface 42 is embodied as a silver-plated layer or surface which has a good reflection effect and an ability of reflecting more incident light. Alternatively, the reflective display part is embodied as a brightness enhancement film or dual brightness enhancement film (DBEF) which has a reflection effect and an ability of reflecting incident light.

In some embodiments where the reflective display part is embodied as the brightness enhancement film or dual brightness enhancement film while the analyzer 41 is the polarizing sheet, the analyzer 41 and the brightness enhancement film or dual brightness enhancement film are integrated into one body, thereby facilitating disposition of the display part. As a result, a thickness of the display unit 40 is decreased. In addition, in those embodiments where the display unit 40 is made of a film, such display unit 40 has certain flexibility. As a result, impact resistance and thus safety of the display unit 40 are improved.

The display unit 40 may also be embodied as a reflective polarizing optical film such as an advance polarizer film (APF) which has double function of both reflection and polarization. In use, the operational principle of the reflective polarizing optical film is similar to that shown in FIG. 3. Another example of the lighting display device will be described as below by referring to FIG. 3. In FIG. 3, the polarization direction of the polarizer 22 is parallel to a plane of the paper and the polarization direction of the reflective polarizing optical film is perpendicular to the plane of the paper. As shown in the left portion of FIG. 3, when voltage is applied to the liquid crystal layer 24, light emitted from the backlight source 21 passes through the polarizer 22 and then is deflected by the liquid crystal layer 24. After passing through the polarizer 22, the light goes to be parallel to the plane of the paper. While, after being deflected by the liquid crystal layer 24, the light goes to be perpendicular to the plane of the paper. When the light is irradiated onto the reflective polarizing optical film, it passes through a polarizing structure of the reflective polarizing optical film and can be reflected. At this moment, the reflected light can be viewed by the viewer. In other words, the viewer can view displayed contents. Furthermore, as shown in the right portion of FIG. 3, when the liquid crystal layer 24 is powered off, no voltage is applied to the liquid crystal layer 24. After passing through the polarizer 22, light emitted from the backlight source 21 goes to be parallel to the plane of the paper. As such, the light is not deflected when passing through the liquid crystal layer 24. Therefore, when being irradiated onto the reflective polarizing optical film, the light cannot pass through the polarizing structure of the reflective polarizing optical film, and thus the reflective polarizing optical film is in a dark state.

Furthermore, in addition to the above structure, the lighting display device further comprises a lamp cover 30 fitted over the surface light source type display lamp 20. Beams of light are gathered by means of the lamp cover 30, thereby avoiding the problem that excessively little light is irradiated onto the display unit 40 due to diffusion of light resulting in adversely affecting display luminance of the display unit 40.

In some embodiments, the lighting display device further comprises a base 10 to which both the surface light source type display lamp 20 and the lamp cover 30 are fixed. The surface light source type display lamp 20 may be fixed to various locations through the base 10. Specifically, the base 10 may be provided with various fixing structures such as a hook and a snap fixing structure, in order to facilitate mounting of the surface light source type display lamp 20.

The above embodiments are only used to explain the present invention, and should not be construed to limit the present invention. It will be understood by those skilled in the art that various changes and modifications may be made therein without departing from the spirit of the present invention, the scope of which is defined in the appended claims and their equivalents.

What is claimed is:

1. A lighting display device, comprising:
a surface light source type display lamp comprising: a backlight source, a first transparent substrate and a second transparent substrate laminated in sequence in a direction away from the backlight source, a liquid crystal layer disposed between the first transparent substrate and the second transparent substrate, a polarizer disposed on a side of the first transparent substrate facing the backlight source, and, pixel units disposed on one of the first transparent substrate and the second transparent substrate, the pixel units being arranged in a matrix and being configured to control rotation of liquid crystal molecules in the liquid crystal layer, and
a display unit spaced from the surface light source type display lamp by a set distance, wherein the display unit has a polarization and reflection structure which is configured to cooperate with the polarizer and is configured to reflect light emitted by the surface light source type display lamp to display.

2. The lighting display device of claim 1, wherein:
the polarizer comprises a polarizing sheet.

3. The lighting display device of claim 1, wherein:
the display unit comprises a reflective polarizing optical film.

4. The lighting display device of claim 1, wherein:
the display unit comprises a reflective display part, and an analyzer disposed on a side of the reflective display part facing the surface light source type display lamp.

5. The lighting display device of claim 4, wherein:
the analyzer comprises a polarizing sheet.

6. The lighting display device of claim 5, wherein:
the reflective display part comprises a reflector layer or reflector surface.

7. The lighting display device of claim 5, wherein:
the reflective display part comprises a brightness enhancement film.

8. The lighting display device of claim 7, wherein:
the analyzer and the brightness enhancement film are integrated into one body.

9. The lighting display device of claim 1, further comprising:
a lamp cover fitted over the surface light source type display lamp.

10. The lighting display device of claim 9, further comprising:
a base to which both the surface light source type display lamp and the lamp cover are fixed.

11. The lighting display device of claim 9, wherein:
a polarization direction of the polarizer of the surface light source type display lamp and a polarization direction of the polarization and reflection structure of the display unit are substantially perpendicular to each other.

12. The lighting display device of claim 1, wherein:
the surface light source type display lamp is disposed separately from the display unit.

13. The lighting display device of claim 2, further comprising:
a lamp cover fitted over the surface light source type display lamp.

14. The lighting display device of claim 13, further comprising:
a base to which both the surface light source type display lamp and the lamp cover are fixed.

15. The lighting display device of claim 3, further comprising:
a lamp cover fitted over the surface light source type display lamp.

16. The lighting display device of claim 4, further comprising:
a lamp cover fitted over the surface light source type display lamp.

17. The lighting display device of claim 5, further comprising:
   a lamp cover fitted over the surface light source type display lamp.

18. The lighting display device of claim 6, further comprising:
   a lamp cover fitted over the surface light source type display lamp.

19. The lighting display device of claim 7, further comprising:
   a lamp cover fitted over the surface light source type display lamp.

20. The lighting display device of claim 8, further comprising:
   a lamp cover fitted over the surface light source type display lamp.

* * * * *